United States Patent
Schweitzer et al.

(10) Patent No.: US 8,877,055 B2
(45) Date of Patent: Nov. 4, 2014

(54) FILTER HAVING DRAIN VALVE WITH MECHANICAL LOCK

(75) Inventors: Stephen Schweitzer, Kearney, NE (US); Mitch Bendix, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 1058 days.

(21) Appl. No.: 12/903,740

(22) Filed: Oct. 13, 2010

(65) Prior Publication Data

US 2012/0091051 A1    Apr. 19, 2012

(51) Int. Cl.
*B01D 35/16*    (2006.01)
*B01D 36/00*    (2006.01)

(52) U.S. Cl.
CPC ................................ *B01D 36/006* (2013.01)
USPC .......................................... 210/248; 210/238

(58) Field of Classification Search
CPC ................................................... B01D 35/16
USPC ................................................ 210/248, 238
See application file for complete search history.

(56) References Cited

U.S. PATENT DOCUMENTS

| 4,893,651 | A | 1/1990 | Herman et al. |
|---|---|---|---|
| 5,144,978 | A | 9/1992 | Brown et al. |
| 5,547,565 | A | 8/1996 | Biere et al. |
| 6,565,746 | B1 * | 5/2003 | Stamey et al. ............... 210/248 |
| 2007/0034560 | A1 | 2/2007 | Janik et al. |
| 2008/0223461 | A1 | 9/2008 | Gerwin et al. |

* cited by examiner

*Primary Examiner* — Thomas M Lithgow
(74) *Attorney, Agent, or Firm* — Reinhart Boerner Van Deuren P.C.

(57) ABSTRACT

A filter with a drain valve is provided. The drain valve mounts within an opening of a housing of the filter. The drain valve has a knob mounted to a valve member thereof. At least one locking structure is disposed between the knob and the valve member to mechanically lock the knob to the valve member. Such a configuration reduces the likelihood that the knob will become inadvertently dislodged during operation.

17 Claims, 4 Drawing Sheets

FILTER HAVING DRAIN VALVE WITH MECHANICAL LOCK

FIELD OF THE INVENTION

This invention generally relates to fuel/water separators and more particularly to drain valves associated therewith.

BACKGROUND OF THE INVENTION

Fuel/water separation filters are commonly used in contemporary internal combustion engines. As fuel flows through the filter, water and other contaminants are separated from the fuel and collect in a chamber of the filter. Periodically, the water and other contaminants must be drained from the filter. As a result, the above filters often include drain valves to effectuate drainage of the water and other contaminants. One such filter incorporating a drain valve can be found at U.S. Pat. No. 5,144,978 to Brown et al., the entire disclosure of which is incorporated herein by reference. Embodiments of the present invention generally relate to improvements in the design and function of the aforementioned filters.

BRIEF SUMMARY OF THE INVENTION

In view of the above, embodiments of the present invention provide a filter with a drain valve assembly that overcomes existing problems in the art. More particularly, embodiments of the present invention provide a drain valve assembly that incorporates a mechanical lock between a knob and a valve member thereof. With such a configuration, there is a reduced likelihood that the knob will become dislodged from the valve member in the field.

In one claimed aspect, a filter having a drain valve is provided. A filter according to this embodiment includes a filter housing having media therein. The filter housing has a threaded opening with a valve seat surrounding the opening. The filter also has a valve assembly that includes a valve member and a knob. The valve member has a valve head adapted to seal against the valve seat. The valve member also has a valve stem positioned within the threaded opening. The valve stem has at least one tab projecting from an end thereof. The at least one tab of the valve stem engages the knob to fixedly retain the knob on the valve stem.

In another claimed aspect, a filter having a drain valve is provided. The filter according to this embodiment includes a housing having a canister with an opening and a valve seat surrounding the opening. The filter also includes a valve assembly carried by the canister. The valve assembly has a rotatable valve member adapted to seal against the valve seat. The rotatable valve member has an outer periphery defining a lip. A knob having an aperture for receipt of a portion of the rotatable valve member is also provided. The aperture has an inner periphery radially spaced apart from the outer periphery of the portion of the rotatable valve member by a clearance gap. A locking structure is disposed between the knob and the rotatable valve member and axially extends across the clearance gap. The locking structure is operable to bias an abutting surface of the knob against the lip such that the knob is fixedly positioned along the rotatable valve member.

In yet another claimed aspect, a filter is provided. A filter according to this embodiment includes a filter housing having filter media therein. The filter housing has an opening with a valve seat surrounding the opening. A valve assembly extends through the opening. The valve assembly has an axially movable valve member and a knob. The axially movable valve member is adapted to move toward and away from the valve seat and seal against the valve seat in a closed position. The knob is mounted to the axially movable valve member with a deformed portion of the valve assembly.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
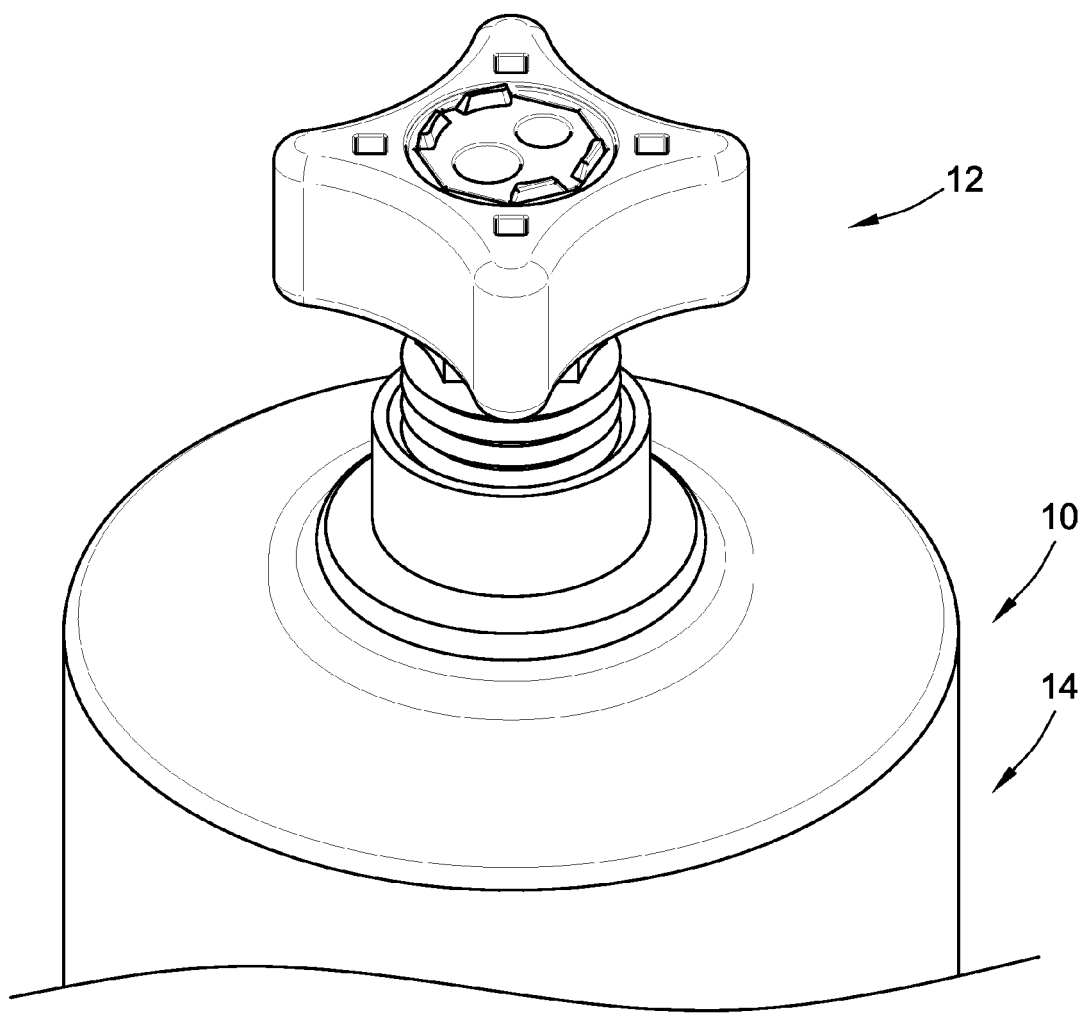
FIG. 1 is a partial perspective view of a filter with a drain valve according to the teachings of the present invention.
Figure 2:
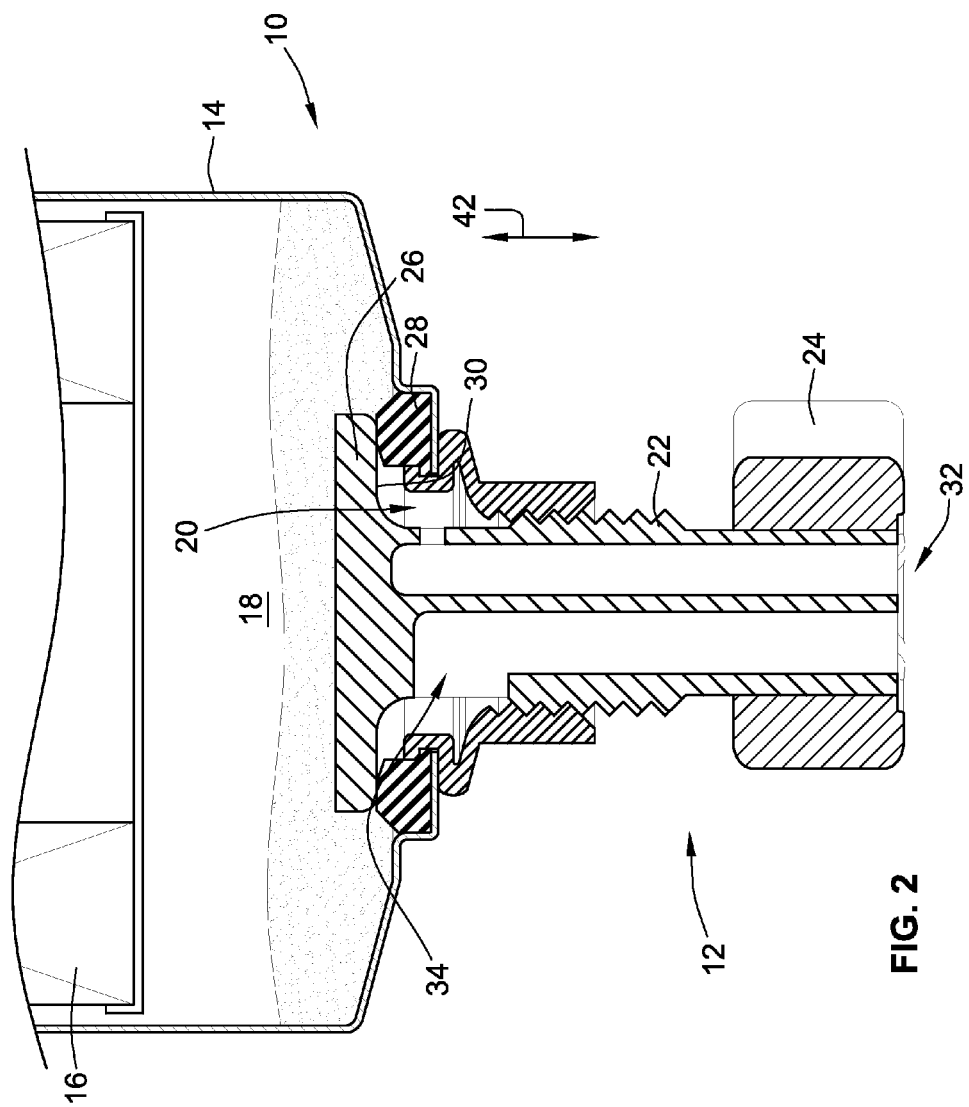
FIG. 2 is a partial front cross section of the filter of FIG. 1 with the drain valve in a closed position.

Turning now to the drawings, there is illustrated in FIG. 1 an exemplary embodiment of a filter 10 incorporating a drain valve assembly 12 mounted to a housing 14 of the filter 10 according to the present invention. As will be discussed in greater detail in the following, the drain valve assembly 12 allows for periodic draining of water and other contaminants collected within the housing 14 during filtration. With reference to FIG. 2, the housing 14 has a canister portion that carries filter media 16 within a chamber 18 therein. During the filtration process, water and other contaminants will collect in a bottom of the chamber 18 as illustrated. Periodically, the water and other contaminants within the chamber 18 must be drained to ensure the efficient and effective operation of the filter 10. As will be discussed in greater detail below, a user of the filter 10 can selectively open and close the drain valve assembly 12 by hand to facilitate such drainage.

Still referring to FIG. 2, the drain valve assembly 12 is positioned within an opening 20 of the housing 14. The drain valve assembly 12 includes a rotatable valve member 22 with a knob 24 connected thereto by a deformed portion therebetween. The deformed portion may be part of the valve and/or part of the knob, and in one embodiment, is shown taking the form of locking structures or tabs 50. The knob 24 is configured for hand manipulation, and rotation of the knob 24 will also result in rotation of the rotatable valve member 22. The valve member 22 has a valve head 26 that moves linearly towards and away from a valve seat 28 that surrounds the opening 20 upon rotation of the knob 24 and valve member 22. When the valve head 26, and more particularly a sealing surface 30 thereof, is in contact with the valve seat 28, the drain valve assembly 12 is in a closed position such that water and other contaminants cannot drain out of the chamber 18.

Figure 3:
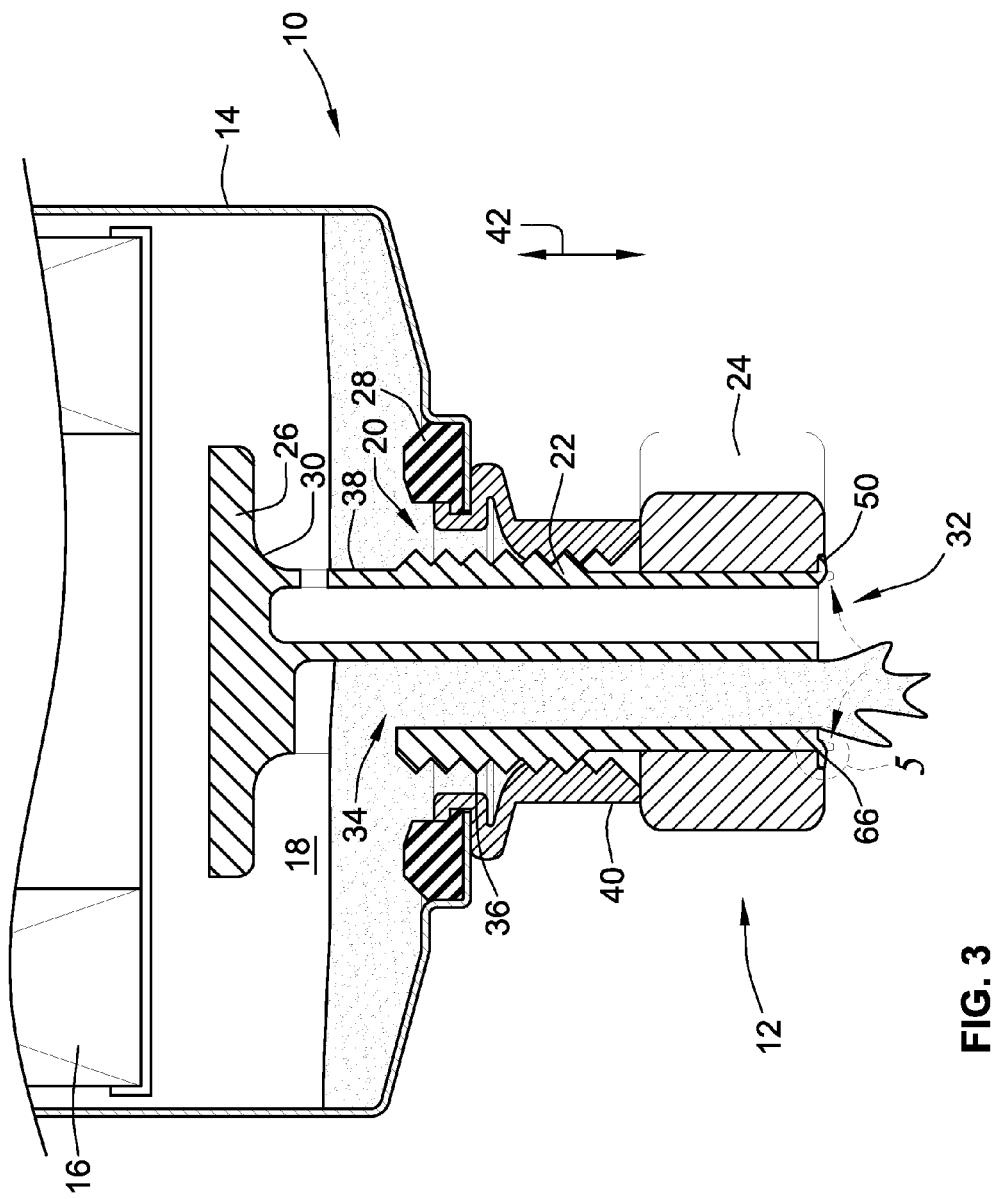
FIG. 3 is a partial front cross section of the filter of FIG. 1 with the drain valve in an open position.

Turning now to FIG. 3, the drain valve assembly 12 is illustrated in the open position. When in the open position, air is permitted to flow from the exterior of the filter 10 through a vent 32 of the valve member 22 and into the chamber 18 of the housing 14. When this occurs, the water and other contaminants contained within the chamber 18 will flow out of the housing 14 through a drain 34 formed in the valve member 22. As such, the drain valve assembly 12 generally moves along direction line 42 to facilitate the periodic draining of water and other contaminants contained within the chamber 18 of the housing 14.

Movement along direction line 42 is provided in part by a threaded nut 40 mounted to the housing and in threaded engagement with the valve member 22. As a user rotates the knob 24, the valve member 22 will move into and out of engagement with the valve seat 28. Although illustrated as incorporating a threaded nut 40, it is recognized that the opening 20 of the housing 14 can be threaded to allow for the linear movement of the valve member 22 relative to the housing 14 without the use of an additional threaded nut 40.

The valve seat 28 is situated within the chamber 18 of the housing 14 and surrounds the opening 20 thereof. In the illustrated embodiment, the valve seat 28 is a compressible gasket. The gasket is held in place by the threaded nut 40.

Figures 4, 5:
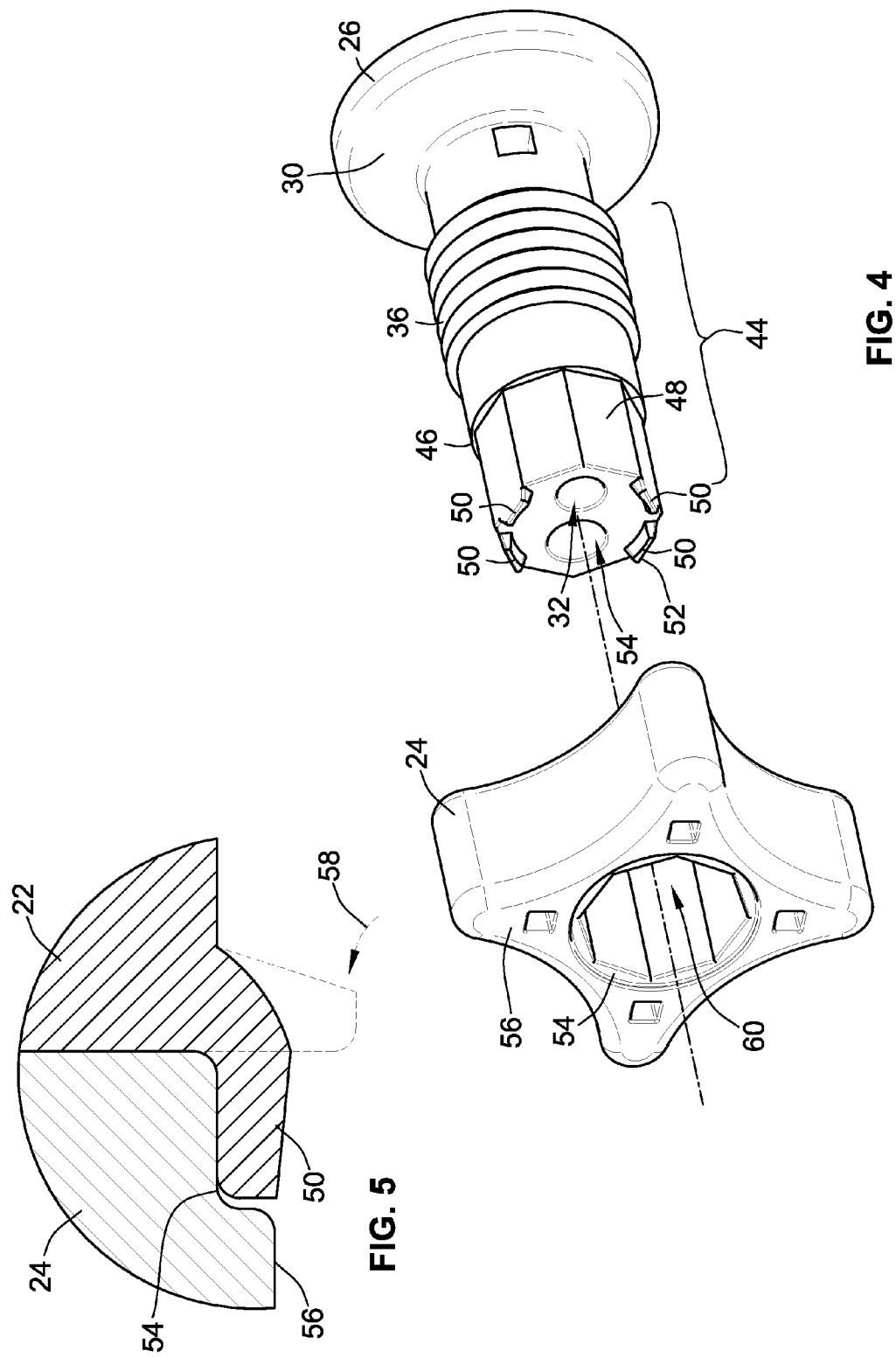
FIG. 4 is on an exploded perspective view of a valve stem and a knob of the drain valve of FIG. 1.
FIG. 5 is a partial front cross section of the knob installed on the stem of the drain valve of FIG. 1.

Turning now to FIG. 4, the valve member 22 has a valve stem 44 that extends away from the valve head 26. The valve stem 44 has threads 36 formed on an outer surface 38 of the valve stem 44. The threads 36 engage the threaded nut 40 (see FIGS. 2 and 3) to allow for the selective engagement and disengagement of the sealing surface 30 of the valve head 26 with the valve seat 28.

The valve stem 44 also includes a lip 46 for location of the knob 24. As illustrated in FIGS. 2 and 3, when the knob 24 is fully installed on the valve member 22, the knob 24 is in abutted contact with the lip 46. The valve stem 44 also has a keyed portion 48 that matches a keyed aperture 60 of the knob 24. As will be discussed in greater detail below, the keyed portion 48 and knob 24 maintain a keyed relationship when fully assembled such that the knob 24 cannot rotate relative to the valve member 22.

Still referring to FIG. 4, one or more locking structures 50 extend away from the keyed portion 48. The locking structures 50 are located at an outer peripheral edge 52 of the keyed portion 48. The locking structures 50 may be intermittently situated around the outer peripheral edge 52, as illustrated, or can be provided by a continuous lid or edge extending from the outer peripheral edge 52 of the keyed portion 48.

Referring now to FIGS. 4 and 5, the locking structures 50 are deformable generally in direction 58 such that they engage a relief 54 formed into a top surface 56 of the knob 24. The locking structures 50 are deformed against the relief 54 of the knob 24 such that the knob 24 is biased against the lip 46 (see FIG. 3) formed on the valve stem 44 of the valve member 22. As such, the knob 24 is advantageously fixed to the valve member 22 such that the knob 24 is generally prevented from axial displacement along the valve member 22.

Turning back to FIG. 4, the locking structures 50 are illustrated as a deformed portion of the valve stem 22 that generally extends across a clearance gap formed between the valve member 22 and the knob 24. The locking structures 50 can be deformed in a variety of ways including but not limited to, swaging, punching or similar processes.

Referring back to FIGS. 2 and 3, the locking structures 50 hold the knob 26 in place along the valve member 22 and against the lip 46 thereof. As the knob 24 is rotated by hand, there is reduced likelihood that the knob 24 will become dislodged from the valve member 22. As such, the filter 10 generally presents a more robust construction with a reduced failure mode in the field.

As described herein, the filter 10 incorporates a drain valve assembly 12 that overcomes existing problems in the art by providing a reliable assembly that can be repeatedly opened and closed with a reduced likelihood that the knob 24 will fall off of the valve member 22.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter having a drain valve, comprising:
   a filter housing having media therein, the filter housing having a threaded opening and a valve seat surrounding the opening;
   a valve assembly comprising a valve member and a knob, the valve member having a valve head adapted to seal against the valve seat and a valve stem positioned within the threaded opening, the valve stem having at least one tab projecting from a top surface of the valve stem;
   wherein the at least one tab of the valve stem engages the knob to fixedly retain the knob on the valve stem;
   wherein the knob includes a relief surface formed in a top surface of the knob, and whwerein the knob is mounted upon the valve stem such that the relief surface is coplanar with the top surface of the valve stem and there is a clearance gap radially between the valve stem and the knob, the at least one tab extending radially across the clearance gap such that it is in contact with the relief surface of the knob.

2. The filter of claim 1, wherein the valve stem has at least one passageway extending from a first port at the end of the valve stem to a second port formed in an outer periphery of the valve stem, the at least one passageway of the valve stem adapted to provide fluid communication between an internal chamber of the filter housing and ambient.

3. The filter of claim 2, wherein the at least one tab projects from the end of the valve stem such that the first port is radially internal relative to the at least one tab on the end of the valve stem.

4. The filter of claim 1, wherein the valve stem has an outer periphery that provides a lip adapted to axially locate the knob along the valve stem.

5. The filter of claim 4, wherein the knob is axially positioned between the lip and the at least one tab along the valve stem.

6. The filter of claim of claim 1, wherein the at least one tab is a deformed portion of the valve stem that extends radially across the clearance gap.

7. A filter having a drain valve, comprising:
a housing having a canister with an opening and a valve seat surrounding the opening;
a valve assembly carried by the canister, the valve assembly having a rotatable valve member adapted to seal against the valve seat, the rotatable valve member having an outer periphery defining a lip;
a knob having an aperture for receipt of a portion of the rotatable valve member, the aperture having an inner periphery radially spaced apart from the outer periphery of the portion of the rotatable valve member by a clearance gap
a locking structure disposed between the knob and the rotatable valve member and radially extending across the clearance gap, the locking structure operable to bias an abutting surface of the knob against the lip such that the knob is fixedly positioned along the rotatable valve member; and
wherein the locking structure comprises a plurality of tabs separated from one another and extending axially away from a top surface of a valve stem of the valve member, the plurality of tabs symmetrically arranged along an outer peripheral edge of the valve stem.

8. The filter of claim 7, wherein the locking structure is integrally formed with the rotatable valve member at an end thereof.

9. The filter of claim 7, wherein each one of the plurality of tabs engages a relief formed in a top surface of the knob, the relief formed around the aperture.

10. The filter of claim 9, wherein the knob abuts against the lip such that the knob is axially positioned along the rotatable valve member between the lip and the plurality of tabs.

11. The filter of claim 7, wherein the inner periphery of the aperture and the outer periphery of the rotatable valve member are in a keyed arrangement such that rotation of the knob results in rotation of the rotatable valve member.

12. A filter, comprising:
a filter housing having filter media therein, the filter housing having an opening with a valve seat surrounding the opening;
a valve assembly extending through the opening, the valve assembly having a moveable valve member with a valve stem and a knob;
the moveable valve member adapted to move toward and away from the valve seat and seal against the valve seat in a closed position
the knob mounted to the moveable valve member with a deformed portion of the valve assembly, the deformed portion comprising a plurality of tabs extending axially from a top surface of the valve stem such that the top surface of the valve stem is coplanar with a relief surface formed in a top surface of the knob and each one of the plurality of tabs extends radially across a clearance gap formed between the knob and the valve stem to contact the relief surface formed in the top surface of the knob.

13. The filter of claim 12, wherein the deformed portion is arranged along an outer peripheral edge of an end of the valve member.

14. The filter of claim 13, wherein the plurality of tabs are intermittently spaced about the outer peripheral edge.

15. The filter of claim 12, wherein the valve seat is formed by a gasket, the gasket located within a channel surrounding the opening of the housing.

16. The filter of claim 15, further comprising a nut fixedly connected to the housing at the opening, the nut having internal threads providing threaded engagement between the nut and the movable valve member.

17. The filter of claim 16, wherein the nut fixedly retains the gasket within the channel.

\* \* \* \* \*

UNITED STATES PATENT AND TRADEMARK OFFICE
CERTIFICATE OF CORRECTION

| | | |
|---|---|---|
| PATENT NO. | : 8,877,055 B2 | Page 1 of 1 |
| APPLICATION NO. | : 12/903740 | |
| DATED | : November 4, 2014 | |
| INVENTOR(S) | : Schweitzer et al. | |

It is certified that error appears in the above-identified patent and that said Letters Patent is hereby corrected as shown below:

In the Claims

Column 4, Line 61, Claim 1, delete "whwerein" and insert --wherein--.

Signed and Sealed this
Twenty-sixth Day of May, 2015

Michelle K. Lee
*Director of the United States Patent and Trademark Office*